June 6, 1950 — L. W. MUELLER ET AL — 2,510,513
PRESSURE CONTROL INSTALLATION AND METHOD
Filed Jan. 3, 1946 — 2 Sheets-Sheet 2
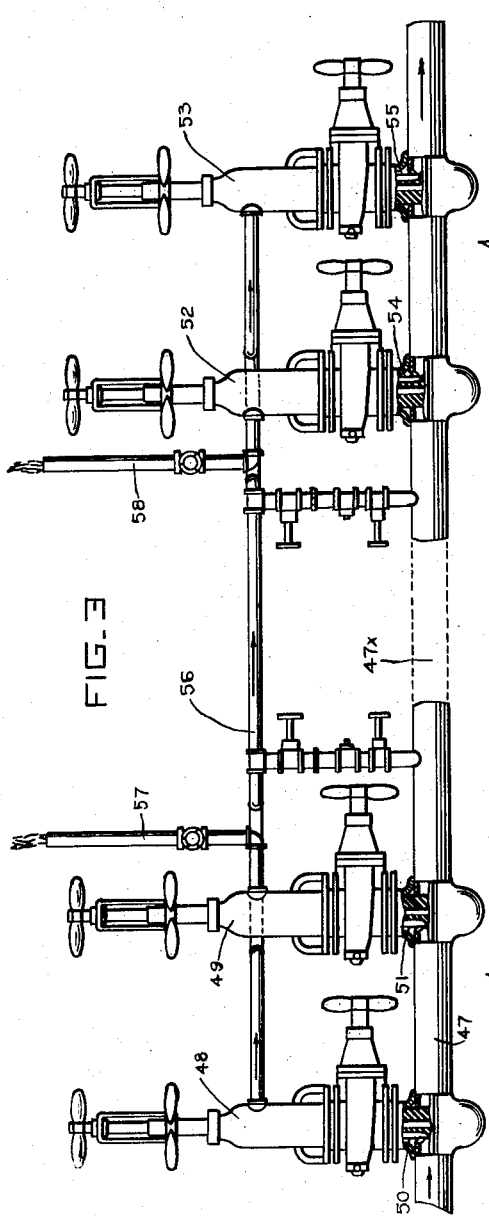
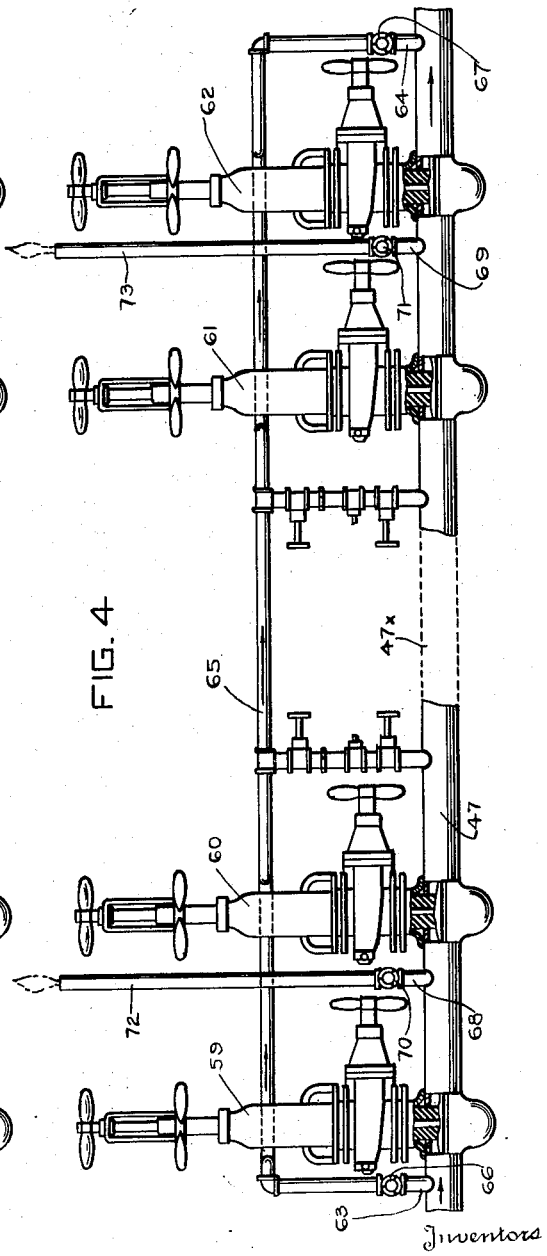
Inventors
LUCIEN W. MUELLER
GEORGE H. HOFMANN
By Cushman, Darby & Cushman
Attorneys

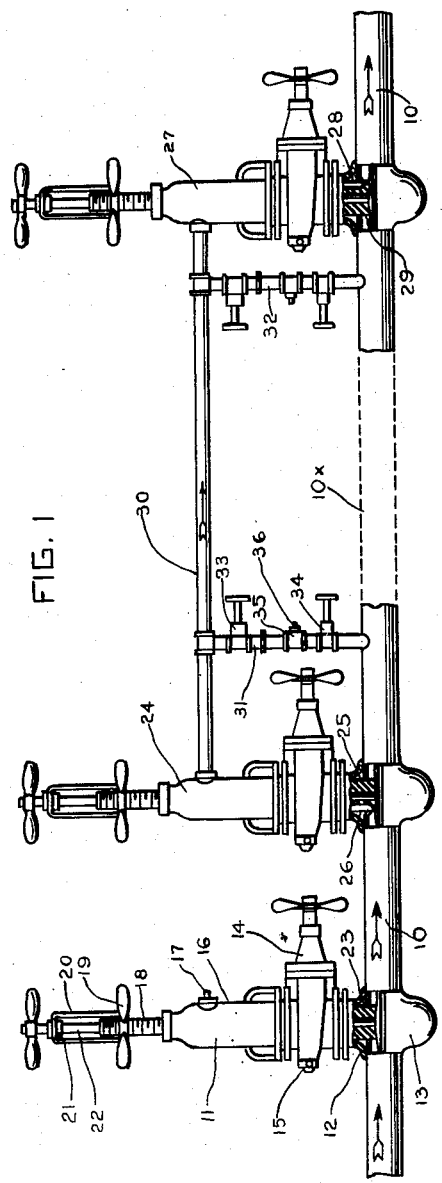
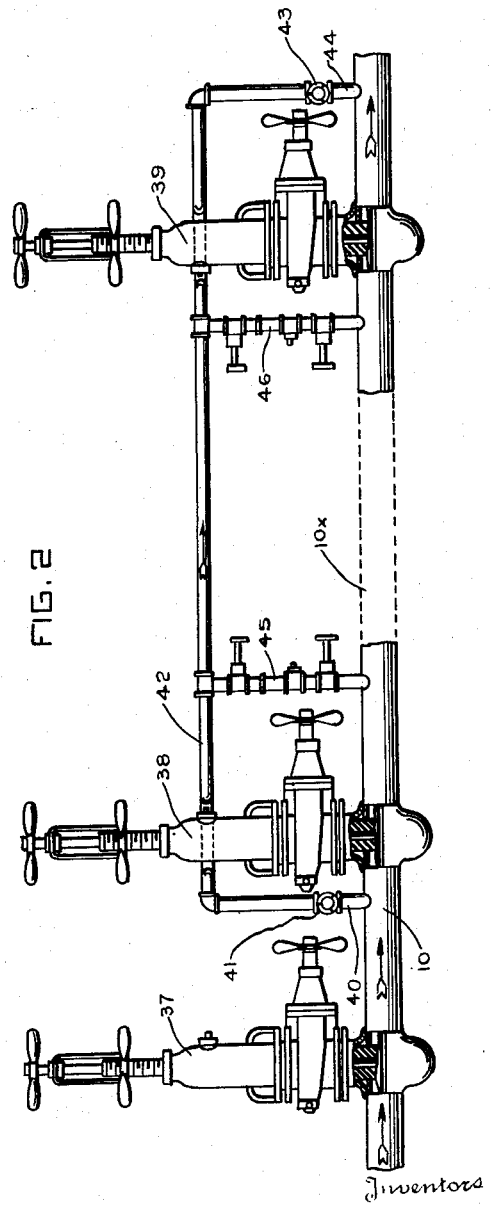

Patented June 6, 1950

2,510,513

UNITED STATES PATENT OFFICE 2,510,513

PRESSURE CONTROL INSTALLATION AND METHOD

Lucien W. Mueller, Decatur, Ill., and George H. Hofmann, Houston, Tex., assignors to Mueller Co., Decatur, Ill., a corporation of Illinois Application January 3, 1946, Serial No. 638,826

2 Claims. (Cl. 137—78)

This invention relates to means and method for the control of pressure in high pressure pipe lines in which a section of the line has to be isolated for any reason, as for repair. The object of the invention is to provide a system whereby the pressure can be safely held, whereby any leakage can be safely disposed of, and whereby, if desired, the isolated section can be by-passed so that the line can be kept in operation. The invention will be described with reference to embodiments shown by way of example in the accompanying drawings, in which Figure 1 is an elevation of one embodiment;

Figure 2 is an elevation showing a modification of the embodiment of Figure 1;

Figure 3 is an elevation of another embodiment, and

Figure 4 is an elevation showing a modification of the embodiment of Figure 3.

In accordance with the invention the line on the upstream side of the section to be isolated is equipped with a number of stopper units, the number being sufficient so that no leakage will occur past the unit which is immediately adjacent the section to be isolated, and means are provided for leading off, from between two adjacent units, any leakage past the remote unit of the said two units. The line at the downstream side of the section to be isolated is equipped with at least one stopper unit.

Referring to Figure 1, the line 10, here considered to be a high pressure oil line, has a section 10x to be isolated. Flow is in the direction of the arrows so that the upstream side is at the left of section 10x and the downstream is at the right.

Reference numeral 11 designates generally a pressure control unit here contemplated as being substantially like that shown in Figure 10 of Patent No. 2,171,577 granted September 5, 1939, to T. A. Larry et al. The unit comprises top and bottom fittings 12 and 13 welded to the pipe, the pipe being provided with top and bottom openings in the manner described in the said patent. Bolted to the fitting 12 is a gate valve 14, this valve, as here contemplated being like that shown in Figure 2 of Patent No. 2,171,942 issued September 5, 1939, to F. H. Mueller, the said gate having a three-position stop 15. Bolted to the top of the gate 14 is a barrel 16 having a lateral opening closed by a plug 17. Rigid with the barrel 16 is a threaded neck 18 with which is engaged a handled feed nut 19. Pivoted to the nut 19 is a yoke 20 having a portion engageable over an abutment 21 on a bar 22 which at its lower end carries a solid compressible plug 23.

Between unit 11 and section 10x a pressure control unit 24 is applied to the line, this unit being the same as unit 11 except that it is equipped with a by-pass type of compressible stopper 25 of the type shown in Patent No. 2,171,576 granted September 5, 1939, to T. A. Larry et al. The by-pass passage is indicated at 26 and is faced toward the remote unit 11.

A pressure control unit 27, exactly like unit 24, is applied to the line at the downstream side of section 10x with the by-pass passage 28 of its compressible stopper 29 faced downstream. The lateral barrel openings of units 24 and 27 are opposed and are connected by a pipe 30 which has equalizing and purging connections 31 and 32 with the line at the upstream and downstream sides of section 10x, respectively. Connection 31 includes upper and lower valves 33 and 34 and an intermediate T 35 normally closed by a plug 36. Connection 32 is equipped in the same manner.

With stopper 23 in stoppering relation to the line there may be some leakage past it due to the high pressure at the upstream side. Any such leakage is lead through unit 24, pipe 30 and unit 27 to the downstream side, thus eliminating any danger which would otherwise arise from the escaping oil. In the illustrated arrangement the pressure is assumed to be not so high but that a single unit 11 will suffice to hold it except for such slight leakage as can be readily handled by the by-pass system. Another unit, identical to unit 11, could be set in advance of the latter, if necessary.

In Figure 2 the upstream side of the line is equipped with two units 37 and 38 exactly like unit 11 of Figure 1 and the unit 39 at the downstream side of the line is also of the solid stopper type. Under these circumstances a safety nipple 40 is applied to the line between units 37 and 38 and through a valve 41, a pipe 42, which is bent behind units 38 and 39, and a valve 43 is connected to a safety nipple 44 applied to the downstream side beyond unit 39. Pipe 42 has the equalizing or purging connections 45 and 46 with the line at the upstream and downstream sides of section 10x, respectively.

In the arrangement just described any leakage past unit 37 is led by the pipe 42 to the downstream side. Under present practice the solid type of stopper is not used beyond the 8 inch size. For larger sizes, stoppers of the type disclosed for example, in Patent No. 2,285,779 granted to F. H.

Mueller et al., June 9, 1942, may be used. Since that type of stopper does not have a by-pass it is necessary under the invention, to use the safety nipple arrangement of Figure 2.

In Figure 3 reference numeral 47 designates, as here contemplated, a high pressure gas main including a section 47x to be isolated and, at the same time, the main is to be kept in operation. Applied to the upstream side of the line are pressure control units 48 and 49 which are of the by-pass type and have their by-pass passages 50 and 51 faced upstream. The downstream side of the line is equipped with similar units 52 and 53 whose by-pass passages 54 and 55 are faced downstream. The barrels of units 48 and 53 are connected by a by-pass pipe 56 whereby service on the downstream side can be maintained. The barrel of unit 49 is equipped with a valved elbow 57 which discharges into the atmosphere for burning any leakage past unit 48 and unit 52 is similarly equipped with an elbow 58. Where the downstream pressure is low enough, say 100 pounds or less, unit 52 may be omitted. The same equalizing and purging connections as in Figure 1 are shown.

In Figure 4 the units 59 to 62 are of the solid stopper type. In this case safety nipples 63 and 64 are applied to the main in advance of unit 59 and behind unit 62, respectively, and are connected through a pipe 65 and valves 66 and 67 so that service can be maintained. Safety nipples 68 and 69 are applied to the line between units 59, 60 and 61, 62, respectively, and through valves 70 and 71 are connected with vertical pipes 72 and 73 through which leakage is carried to the atmosphere for burning. In large size mains stoppers of the type disclosed in the above mentioned Patent No. 2,285,779 may, of course, be used.

It will be understood that the described installations are given as typical and that variations in the form and arrangement of parts, and in the number of pressure control units used, may be made without departure from the invention as defined in the claims which follow.

We claim:

1. The method of repairing a high pressure fluid line which comprises stoppering the line immediately adjacent to and on the downstream side of the section of pipe to be repaired by drilling an opening in and plugging the line while maintaining control against escape of fluid from the line, and similarly stoppering the line at two closely spaced points immediately adjacent to and on the upstream side of the section of pipe to be repaired, and thereafter relieving fluid under pressure from the line between said two spaced stoppering points to prevent fluid which may leak past the closed plug at the first of said two spaced stoppering points in the direction of flow of the fluid from building up pressure against the plug at the second of said two spaced stoppering points in the direction of flow of the fluid.

2. The method of repairing a high pressure fluid line which comprises stoppering the line immediately adjacent to and on the downstream side of the section of pipe to be repaired by drilling an opening in and plugging the line while maintaining control against escape of fluid from the line, and similarly stoppering the line at two closely spaced points immediately adjacent to and on the upstream side of the section of pipe to be repaired, and thereafter discharging fluid which may leak past the closed plug at the first of said two spaced stoppering points in the direction of flow of the fluid into the line beyond the stoppering point on the downstream side of the section of pipe under repair, whereby to prevent the building up of pressure in the line between said two spaced stoppering points against the plug of the second of said two spaced stoppering points in the direction of flow of the fluid.

LUCIEN W. MUELLER.
GEORGE H. HOFMANN.

REFERENCES CITED

The following references are of record in the file of this patent:

UNITED STATES PATENTS

| Number | Name | Date |
|---|---|---|
| 945,552 | Koenig | Jan. 4, 1910 |
| 982,505 | Koenig | Jan. 24, 1911 |
| 1,065,466 | Oir | June 24, 1913 |
| 2,171,576 | Larry et al. | Sept. 5, 1939 |
| 2,171,937 | Larry et al. | Sept. 5, 1939 |
| 2,171,942 | Mueller | Sept. 5, 1939 |